(12) United States Patent
Ranganathan et al.

(10) Patent No.: US 8,169,181 B2
(45) Date of Patent: May 1, 2012

(54) INDUCTION MOTOR

(75) Inventors: Vilanguppam Thathachary Ranganathan, Karnataka (IN); Kamalesh Hatua, West Bengal (IN)

(73) Assignee: Indian Institute of Science, Bangalore, Karnataka (IN)

( * ) Notice: Subject to any disclaimer, the term of this patent is extended or adjusted under 35 U.S.C. 154(b) by 343 days.

(21) Appl. No.: 12/647,170

(22) Filed: Dec. 24, 2009

(65) Prior Publication Data

US 2011/0050157 A1 Mar. 3, 2011

(30) Foreign Application Priority Data

Aug. 28, 2009 (IN) .......................... 2068/CHE/2009

(51) Int. Cl.
*H02P 23/00* (2006.01)

(52) U.S. Cl. ........ 318/818; 318/727; 318/812; 318/813; 318/814; 318/815

(58) Field of Classification Search .................. 318/818, 318/727, 812–817
See application file for complete search history.

(56) References Cited

U.S. PATENT DOCUMENTS 5,504,667 A * 4/1996 Tanaka et al. .................. 363/37

OTHER PUBLICATIONS

Mahfouz, A. A., et al., "Unity Power Factor Operation for 3-Phase Induction Motors," Proceedings of the 1995 IEEE IECON 21st International Conference on Industrial Electronics, Control, and Instrumentation, Nov. 6-10, 1995, vol. 1, pp. 300-305.
Muteba, M. et al., "Improving Three-Phase Induction Machines Power Factor Using Single Phase Auxiliary Winding Fed by an Active Power Filter", Windhoek, Africon, 2007, Sep. 26-28, 2007, pp. 1-7.
Kwak, S. et al., "A Hybrid Converter System for High-Performance Large Induction Motor Drives", IEEE Transactions of Energy Conversion, Sep. 2005, vol. 20,No. 3, pp. 504-511.
Banerjee D., et al., "Load-Commutated SCR Current-Source-Inverter-Fed Induction Motor Drive with Sinusoidal Motor Voltage and Current", IEEE Transactions on Power Electronics, Apr. 2009, vol. 24, No. 4, pp. 1048-1061.
Patent Abstracts of Japan, JP 63-007157 A (Satake Eng Co Ltd) Jan. 13, 1988.
International Search Report and Written Opinion issued by the Australian Patent Office in PCT/IB2010/053664, dated Dec. 7, 2010.

* cited by examiner

*Primary Examiner* — Walter Benson
*Assistant Examiner* — David Luo
(74) *Attorney, Agent, or Firm* — McDonnell Boehnen Hulbert & Berghoff LLP

(57) ABSTRACT

An active reactive induction motor is provided. The motor comprises two sets of three-phase windings. One set of windings carries the active power and is called the power windings. The second set of windings carries the reactive power and is called the flux windings. The power windings carrying the active power provides more power to the induction motor than the flux windings carrying the reactive power. A driver circuit for driving the active reactive induction motor and the corresponding modes of operation is also provided.

18 Claims, 5 Drawing Sheets

INDUCTION MOTOR

CROSS REFERENCE TO RELATED APPLICATIONS

This application claims priority to Indian Patent Application Serial No. 2068/CHE/2009 filed Aug. 28, 2009, the contents of which are incorporated by reference herein in its entirety.

TECHNICAL FIELD

This application relates to the field of induction motors and motor drives.

BACKGROUND

Synchronous motors that require high output power ranges (beyond 10,000 horsepower) often use current source load commutated inverters (LCI) in their circuit designs. This is due to the LCI's high power ratings and ability to operate as the leading power source for the synchronous motors.

In high power motor drive application, reliability of the machine is important. Many motor drives currently employ voltage source inverters (VSI), but VSI fed induction motors have been shown to have a higher chance of failure.

SUMMARY

An improved induction motor is provided. In one example embodiment, the induction motor includes a power winding providing active power, and a flux winding providing the reactive power, wherein the power winding carries more power than the flux winding by a ratio. In another embodiment, the ratio between the power carried by the flux winding and the power winding is in range of 0.2 to 0.8. In a further embodiment, the improved induction motor includes a current source inverter and a first voltage source inverter, wherein the current source inverter drives the power winding and a voltage source inverter drives the flux winding. In a further embodiment, the improved induction motor includes a second voltage source inverter, wherein the second voltage source inverter cancels harmonics from the current source inverter, and wherein the voltage source inverter and the second voltage source inverter share a common DC bus. In yet another embodiment, the improved induction motor includes a filter between the current source inverter and the power winding.

A method for operating the improved induction motor is also provided. In an example embodiment, the steps for operating the induction machine using the fundamental frequency output of a current source inverter; and supplying a reactive power to a flux winding using a voltage source inverter. The method further includes removing harmonics from the current source inverter output using a second voltage source inverter. In a further embodiment, the second voltage source inverter provides a current phase angle that leads a voltage phase angle, such that the induction motor may be used for load commutation and the voltage source inverter and the second voltage source inverter share a common DC bus.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
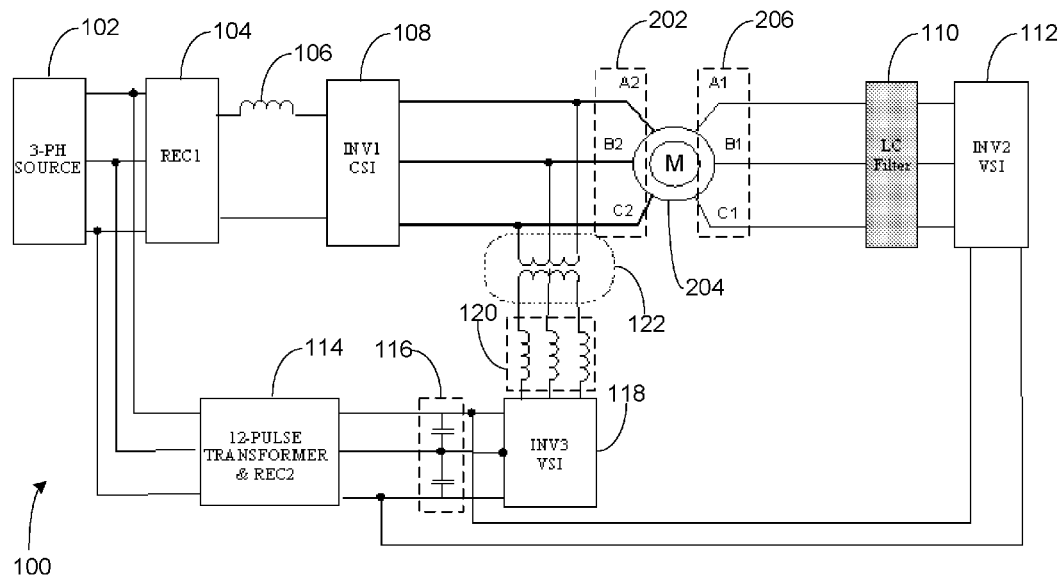
FIG. 1 is an illustrative circuit block diagram showing an active reactive induction motor drive system, having a CSI/VSI mixed circuit driving the active reactive induction motor.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

FIG. 1 is an illustrative circuit block diagram showing an active reactive induction motor drive system 100, having a CS/VSI mixed circuit driving an active reactive induction motor. The motor drive system 100 includes a three-phase source 102, a phase-controlled rectifier 104, a DC link inductor 106, a current source inverter (CSI) 108, an LC filter 110, a first voltage source inverter (VSI) 112, a twelve-pulse transformer 114, bus capacitors 116, a second VSI 118, a set of frequency control inductors 120, a step-up transformer 122, and an induction motor having an active winding 202, a flux winding 206, and a motor 204.

The active winding 206 is connected to the three-phase source 102 via the phase-controlled rectifier 104, the DC link inductor 106 and the CSI 108. The CSI 108 may be used to inject the fundamental component (50-60 Hz) of the active winding current. In one embodiment, the CIS 108 may be implemented using thyristor devices. In one embodiment, a thyristor-based CSI 108 may inject a quasi-square wave current into the motor 204 via the active winding 202. As such, the thyristor-based CIS 108 may be switched at a fundamental frequency of a motor voltage of the motor 204, and supplies the active power to the motor 204.

The flux winding 206 is connected to the first VSI 112 via the LC filter 110. As such, the first VSI 112 supplies the reactive power to the motor 204. In one embodiment, the flux winding voltage can be at 2.2 kV. In this case, no transformer is required to boost the voltage. The LC filter 110 between the first VSI 112 and the flux winding 206 provides sinusoidal voltage and current signals from the first VSI 112 to the flux winding 206. The first VSI 112 also supplies extra field axis current such that the active winding have a leading current phase angle.

The active winding 202 is also connected to the three-phase source 102 via the step-up transformer 122, the set of frequency control inductors 120, the second VSI 118, the bus capacitors 116, and the twelve-pulse transformer 114. The nodes between the bus capacitors 116 and the twelve-pulse transformer 114 and between the bus capacitors 116 and the second VSI 118 are also connected to the first VSI 112. The second VSI 118 may be used as a harmonic compensator for the quasi-square wave current injected by the CSI 108. The second VSI 118 injects harmonic currents may be used to make the quasi-square wave current sinusoidal. Because the current in the active winding 202 leads the voltage in the active windings 202, the embodiment using a thyristor-based CSI 108 can be load-commutated. The phase-controlled rectifier 104 and DC link inductor 106 may be used to generate a controlled DC link current. In this embodiment, the second VSI 118 and the first VSI 112 may share a common DC bus, wherein the twelve-pulse transformer 114 generates the DC bus voltages for the second VSI 118 and the first VSI 112. In another embodiment, the current leads the corresponding phase voltage for load commutation of the thyristors in the thyristor-based CSI 108, such that the phase angle between the current and the voltage can be obtained from the reactive current injection from either the first VSI 112 or the second VSI 118.

For controlling the speed of the motor 204 in the induction motor 200, a speed controller can be used to generate the torque reference required. The torque reference can be used to determine how much active winding current is required, and a flux controller output can be used to determine how much flux winding current is required.

In contrast to the operation of the induction motor drive system 100 described above, which has both an active winding 202 and a flux winding 206, a motor system having only a set of active windings requires a single VSI driver to supply both the active power as well as the reactive power and the harmonics. This may lead to the single VSI operating at a higher frequency and result in higher losses. As such, having the first VSI 112 provide the reactive power, the second VSI 118 may operate at a lower frequency and incur lower losses as compared to the case when a single VSI is used to supply both the active power as well as the reactive power and the harmonics.

The induction motor drive system 100 of FIG. 1 may have multiple modes of operation. In a first mode, the phase angle between the active winding current and the active winding voltage can be adjusted by reactive current injection from the second VSI 118. In this mode, the current in the active winding lags the motor voltage by a small angle due to the leakage voltage drop across the motor. In this first mode, the fundamental current of the CSI 108 leads the motor terminal voltage by a phase angle β.

Figure 2:
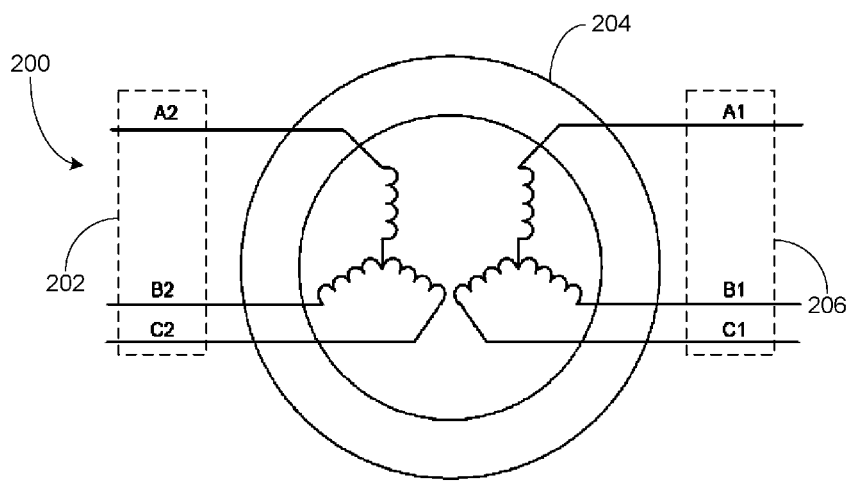
FIG. 2 is an illustrative schematic of an active reactive induction motor which may be driven by the drive system of FIG. 1.

FIG. 2 is an illustrative schematic of an active reactive induction motor 200 having two sets of three-phase windings, which may be driven by the motor drive system 100 of FIG. 1. As relates to FIG. 1, the windings A1, B1 and C1 are designated as the flux windings 206 of the induction motor 200, and the windings A2, B2 and C2 are designated as the active windings 202 of the induction motor 200. In the following discussion, the "active winding" is the winding carrying the active power and the "flux winding" is the windings carrying the reactive power.

In an embodiment, the active power of the active reactive induction motor 200 comes from the active winding 202 and the reactive power comes from the flux winding 206. In one embodiment, the reactive power makes up approximately 15% of the total power from the active reactive induction motor 200. In one embodiment, the voltage in the flux windings 206 leads the current from the flux windings 206 by a phase degree of ninety-degrees, while on the other hand, the voltage and current in the active winding 202 are in the same phase. In one embodiment, the voltage in the active winding 202 and the voltage in the flux winding 206 may be in the same phase. In an embodiment, the flux winding may handle a smaller fraction (around 15%) of the total power, in which case the voltage rating of the flux winding may be lower than voltage rating of the power winding. In another embodiment, the flux winding may have a voltage of 2.2 kV and the active winding may have a voltage of 11 kV.

Figure 3A:
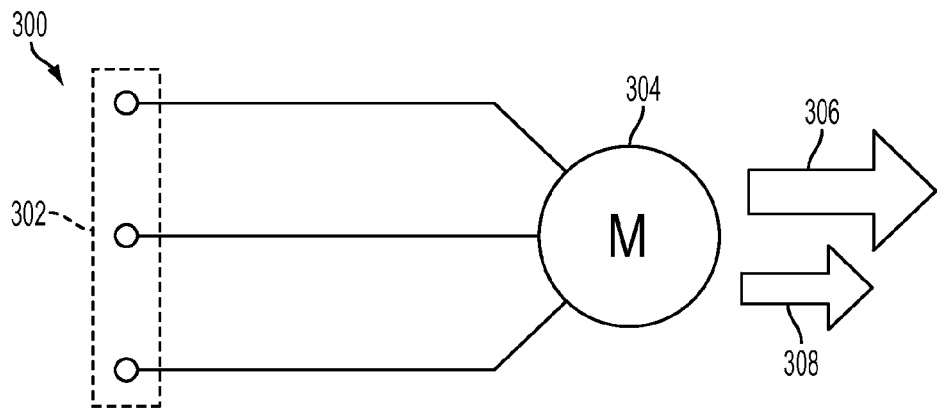
FIG. 3A is an illustrative schematic of an embodiment of an induction motor.
Figure 3B:
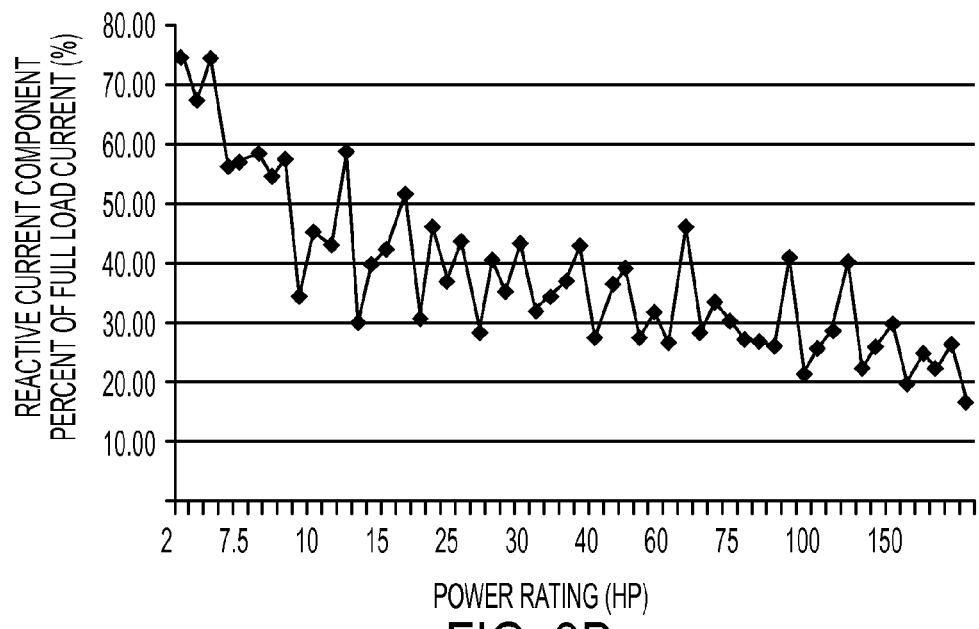
FIG. 3B is an illustrative graph showing the relationship between the percentage of the load current that is the reactive current and the motor power rating for the embodiment of an induction motor shown in FIG. 3B.

The concept and advantages of the active reactive induction motor 200 of FIG. 2 may be further appreciated following the discussions below relating to FIG. 3A, FIG. 3B, FIG. 4 and FIG. 5. FIG. 3A is an illustrative schematic of an embodiment of an induction motor 300, having a three-phase input 302, and a motor 304. The motor 304 is driven by the three-phase input 302 and outputs an active power 306 and reactive power 308. Active power, measured in watts (W) is the power that is mechanically transferred to the rotor of the motor. Reactive power, on the other hand is measured in kilo-volt-amperes (kVA) and created from magnetic current in the motor. Reactive power is required for the magnetization of a motor but does not provide any power to the rotor. FIG. 3B is an illustrative graph showing the relationship between the percentage of the load current that is the reactive current and the motor power rating of an induction motor, such as the induction motor 300 shown in FIG. 3A. As shown in FIG. 3B, the reactive current demand decreases as the power rating of the motor increases.

Figure 4:
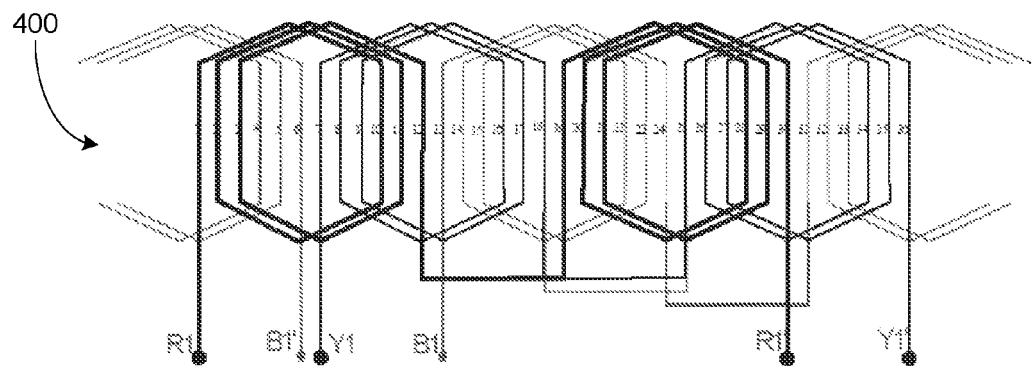
FIG. 4 is an illustrative example of two sets of three-phase windings in an induction motor.

FIG. 4 is an illustrative example of two three-phase windings in an induction motor. As is the case with the active reactive induction motor 200 shown in FIG. 2, one of the winding may carry the active power and the other of windings may carry the reactive power. As shown, one three-phase winding includes R1, B1 and Y1 windings, and the other three-phase winding includes R1', B1' and Y1' windings. The two three-phase windings may both be carried on the stator of the induction motor. The flux winding and the power winding may be positioned such that there is no spatial gap between them. The two windings may be on the same axes, such that there in no phase shift between their orientations. The rotor may be a standard squirrel cage type motor rotor. In addition, both of the three-phase windings may have isolated neutrals, which may have a spatial gap of zero degrees between them. As previously mentioned, the power winding may have a higher voltage rating than the flux windings. The current ratings of the flux and power windings may depend on their respective kVA ratings. The power winding may occupy the top layer while the flux winding may occupy the bottom layer. The two three-phase windings may be full pitched or short pitched.

Figure 5:
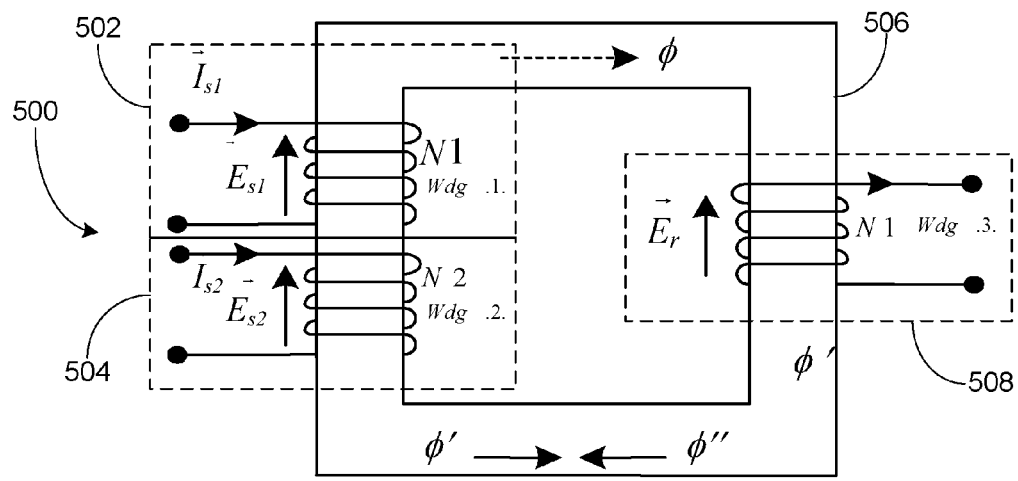
FIG. 5 is an illustrative three-phase winding transformer, with balanced magneto motive forces.

The principle of operation of the two three-phase windings shown in FIG. 4 is similar to that of a three-phase transformer with balanced magnetomotive forces MMF. FIG. 5 is an illustrative three-phase winding transformer 500, with balanced MMF. The three-phase winding transformer includes a first set of winding 502, a second set of winding 504, a third second set of winding 508 and a ferromagnetic core 506. In this embodiment, the first set of winding 502 is the flux winding carrying the reactive power; the second set of winding 504 is the active windings carrying the active power; and the third set of winding 508 is the rotor winding.

In the balanced MMF configuration shown in FIG. 5, the MMF induced by the rotor winding 508 is completely balanced by equal and opposite MMF induced by the active power winding 504. As shown in FIG. 5, ϕ is the flux induced by the flux winding, ϕ, is the flux induced by the active winding, and ϕ, is the flux induced by the rotor winding. The flux ϕ can be defined as:

$$\phi = \frac{N1 \times i_{s1}}{R} \ldots R = \text{Reluctance of the core.}$$

$$V_1 \propto N1 \ldots V_1 = \text{Back emf in excitation winding}$$

To operate the transformer at full flux, ϕ is kept constant. This may be done by keeping the product $N1 \times i_{s1}$ constant. Since the number of winds in each of the three windings is directly proportional to the induced voltage by the flux winding 502, the kVA demand of the motor may be kept constant. As such, both the voltage and current ratings of the induction motor can be designed by adjusting the number of winds in the flux windings 502.

Figure 6A:
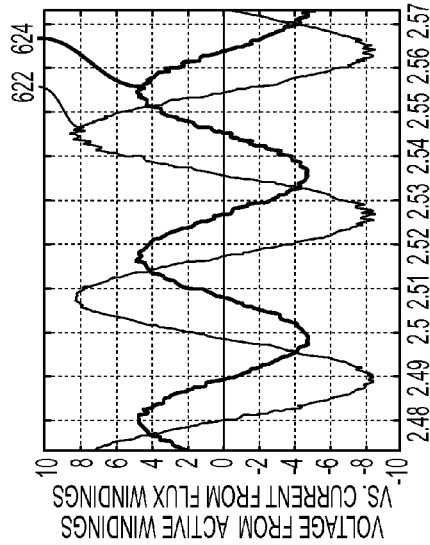
FIG. 6A is a graphical plot showing an active winding current compared against a flux winding current for a first mode of operation of an embodiment of the induction motor shown in FIG. 2.
Figure 6B:
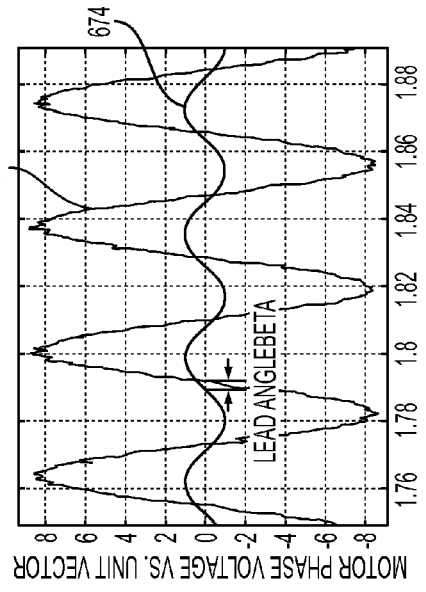
FIG. 6B is a graphical plot showing an active winding voltage compared against a flux winding current for a first mode of operation of an embodiment of the induction motor shown in FIG. 2.
Figure 6C:
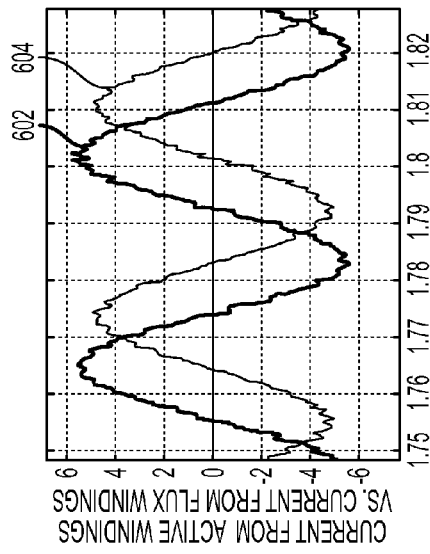
FIG. 6C is a graphical plot showing an R-phase active winding voltage compared against an R-phase active winding current for a first mode of operation of an embodiment of the induction motor shown in FIG. 2.
Figure 6D:
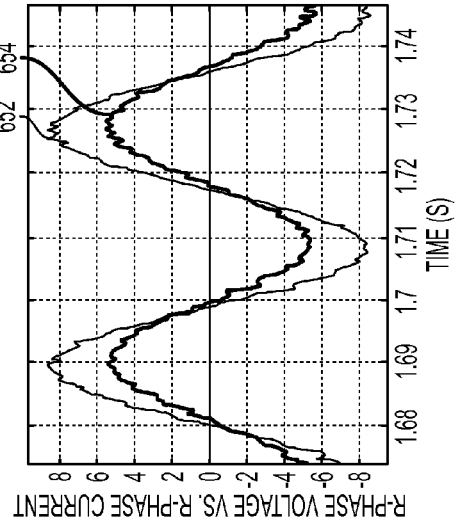
FIG. 6D is a graphical plot showing a motor phase voltage compared against a unit vector for a first mode of operation of an embodiment of the induction motor shown in FIG. 2.

FIGS. 6A-6B are graphs of various waveforms showing the operation of the active reactor induction motor system 100 of FIG. 1 in this first mode. FIG. 6a is a graphical plot showing an active winding current 602 compared against a flux winding current 604 for a first mode of operation of an embodiment of the induction motor shown in FIG. 2. FIG. 6B is a graphical plot showing an active winding voltage 622 compared against a flux winding current 624 for a first mode of operation of an embodiment of the induction motor shown in FIG. 2. FIG. 6C is a graphical plot showing an R-phase active winding voltage 652 compared against an R-phase active windings current 654 for a first mode of operation of an embodiment of the induction motor shown in FIG. 2. FIG. 6D is a graphical plot showing a motor phase voltage 672 compared against a unit vector 674 for a first mode of operation of an embodiment of the induction motor shown in FIG. 2. The unit vector 674 is a unit amplitude sine wave which is in phase with the fundamental component of the phase current to be produced by the CSI.

Figure 7:
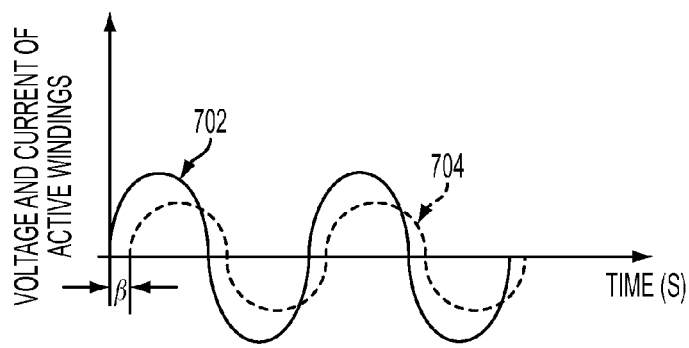
FIG. 7 is a graphical plot showing an active winding voltage compared against an active winding current for a second mode of operation of the embodiment of the induction motor shown in FIG. 2.

In a second mode, the phase angle between the active winding current and the active winding voltage can be adjusted by reactive current injection from the first VSI 112 of the induction motor drive system 100 of FIG. 1. FIG. 7 is a graphical plot showing an active winding voltage 704 compared against an active winding current 702 for a second mode of operation of the embodiment of the induction motor shown in FIG. 4. In this mode, the active winding current from the active windings 702 leads the active windings voltage 704 by the phase angle β. The extra phase angle β is provided from the second VSI 118. In this second mode, the fundamental current of the CSI 108 also leads the motor terminal voltage by β angle.

Figure 8:
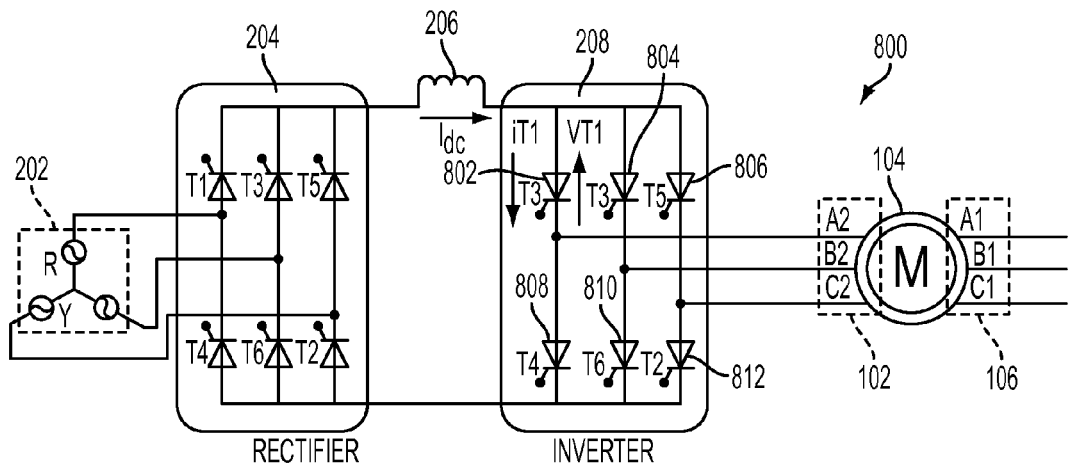
FIG. 8 is an illustrative circuit diagram showing a drive circuit that may be used for driving the active reactive induction motor shown in FIG. 2.

FIG. 8 is an illustrative circuit diagram showing a drive circuit 800 that may be used for driving the active reactive induction motor 200 shown in FIG. 2. The drive circuit 800 shows a portion of an embodiment of the induction motor drive system 100 of FIG. 1, including the three-phase source 102, the phase-controlled rectifier, the DC link inductor 106, the CSI 108 and the active winding 202, flux winding 206 and motor 204. An example of how the CSI 108 can be implemented is also shown, including thyristors 802, 804, 806, 808, 810 and 812.

In the embodiment of the CSI 108 shown in FIG. 8, the anodes of thyristors 802, 804 and 806 share a common node coupled to the DC link inductor 106. The cathodes of thyristors 802, 804 and 806 are connected to the anodes of thyristors 808, 810 and 812, respectively. The cathodes of thyristors 808, 810 and 812 share a common node coupled to a reference signal. The three nodes shared by thyristors 802, 804 and 806, and thyristors 808, 810 and 812 provide the three-phase inputs A2, B2 and C2, respectively to the active windings 402.

For turning off a thyristor such as the ones used in this embodiment of the CSI 108, a negative voltage should be applied across the thyristor to bring the load current below a holding current. During a commutation process, a negative voltage is automatically applied across the outgoing thyristor when the line current leads the phase voltage of the load and results in the smooth turn-off of the thyristor. In this embodiment of the CSI 508, thyristor 802 is an outgoing thyristor and thyristor 804 is an incoming thyristor. When the thyristor 804 is turned on, the voltage between the inputs A2 and B2 is applied across the outgoing thyristor 802. With the motor 204 operating with a leading phase angle β, a negative voltage is applied across the outgoing thyristor 802 for a duration of $t_c$; wherein $t_c$ is defined as:

$$t_c = \frac{\beta}{\omega}; \quad \omega = \text{supply frequency.}$$

Figure 9:
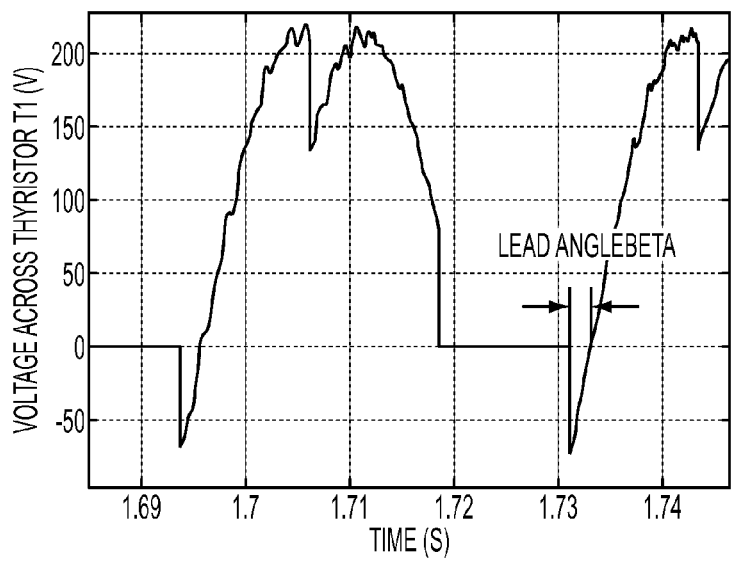
FIG. 9 is a graphical plot showing a voltage waveform across the commutation thyristor T1 of FIG. 8 during a turn-off process.

FIG. 9 shows the voltage waveform across the outgoing thyristor 802 during a turn-off process. FIG. 9 is a graphical plot showing a voltage waveform across the commutation thyristor T1 of FIG. 8 during a turn-off process.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art like the induction machine could be a generator as well. The various aspects and embodiments disclosed herein are for purposes of illustration and are not intended to be limiting, with the true scope and spirit being indicated by the following claims

What is claimed is:

1. An induction motor comprising:
   a power winding providing active power;
   a flux winding providing a reactive power, wherein the power winding carries more power than the flux winding by a ratio;
   a current source inverter configured to drive the power winding;
   a first voltage source inverter configured to drive the flux winding; and
   a second voltage source inverter coupled to the power winding, wherein the second voltage source inverter and the first voltage source inverter are coupled to a common direct current (DC) bus.

2. The induction motor of claim 1, wherein the ratio between the power carried by the flux winding and the power winding is in a range of about 0.2 to 0.8.

3. The induction motor of claim 1, wherein the current source inverter is implemented using thyristors.

4. The induction motor of claim 1, wherein the second voltage source inverter cancels harmonics from the current source inverter.

5. The induction motor of claim 1, further comprising a filter between the current source inverter and the power winding.

6. The induction motor of claim 1, wherein the current source inverter is configured to provide a quasi-square wave current and the second voltage source inverter is configured to provide a harmonic current to cause the quasi-square wave current to be substantially sinusoidal.

7. A method for operating an induction motor comprising,
   driving a power winding of an induction motor using the fundamental frequency output of a current source inverter;
   supplying a reactive power to a set of flux winding using a voltage source inverter; and
   removing harmonics from the fundamental frequency output of the current source inverter using a second voltage source inverter, wherein the voltage source inverter and the second voltage source inverter are coupled to a common direct current (DC) bus.

8. The method of claim 7, wherein driving the power winding provides an active power and wherein the power winding carries more power than the flux winding by a ratio.

9. The method of claim 8, wherein the ratio between the power carried by the flux winding and the power winding is in a range of about 0.2 to 0.8.

10. The method of claim 7, wherein the second voltage source inverter provides a current phase angle that leads a voltage phase angle, such that the induction motor may be load commutated.

11. The method of claim 7, wherein removing harmonics from the fundamental frequency output of the current source inverter comprises providing a harmonic current to cause the output of the current source inverter to be substantially sinusoidal.

12. An induction motor comprising:
- a power winding carrying an active power from a fundamental frequency output of a current source inverter;
- a flux winding carrying a reactive power from a voltage source inverter, wherein the power winding carries more power than the flux windings by a ratio; and
- a second voltage source inverter coupled to the power winding, wherein the voltage source inverter and the second voltage source inverter are coupled to a common DC bus.

13. The induction motor of claim 12, wherein the ratio between the power carried by the flux winding and the power winding is in a range of about 0.2 to 0.8.

14. The induction motor of claim 12, wherein the current source inverter is implemented using thyristors.

15. The induction motor of claim 12, wherein the second voltage source inverter cancels harmonics from the current source inverter.

16. The induction motor of claim 15, wherein the second voltage source inverter provides a current phase angle that leads a voltage phase angle, such that the induction motor may be load commutated.

17. The induction motor of claim 12, further comprising a filter between the current source inverter and the power winding.

18. The induction motor of claim 12, wherein the current source inverter is configured to provide a quasi-square wave current, and wherein the second voltage source inverter is configured to provide a harmonic current to cause the quasi-square wave current to be substantially sinusoidal.

* * * * *

UNITED STATES PATENT AND TRADEMARK OFFICE
CERTIFICATE OF CORRECTION

| | | |
|---|---|---|
| PATENT NO. | : 8,169,181 B2 | Page 1 of 1 |
| APPLICATION NO. | : 12/647170 | |
| DATED | : May 1, 2012 | |
| INVENTOR(S) | : Ranganathan et al. | |

It is certified that error appears in the above-identified patent and that said Letters Patent is hereby corrected as shown below:

In Fig. 1, Drawing Sheet 1 of 5, delete "FIGURE" and insert -- FIG. --, therefor at each occurrence throughout the drawings.

In Column 1, Line 21, delete "(LCI)" and insert -- ((LCIs) --, therefor.

In Column 1, Line 26, delete "(VSI)," and insert -- (VSIs), --, therefor.

In Column 2, Line 63, delete "CS/VSI" and insert -- CSI/VSI --, therefor.

In Column 3, Line 9, delete "CIS" and insert -- CSI --, therefor.

In Column 3, Line 13, delete "CIS" and insert -- CSI --, therefor.

In Column 6, Line 39, delete "CSI 508," and insert -- CSI 108, --, therefor.

In Column 8, Line 19, delete "claims" and insert -- claims. --, therefor.

Signed and Sealed this
Twenty-ninth Day of January, 2013

David J. Kappos
*Director of the United States Patent and Trademark Office*